(12) United States Patent
Ishidoshiro

(10) Patent No.: US 7,319,859 B2
(45) Date of Patent: Jan. 15, 2008

(54) WIRELESS LAN DEVICE

(75) Inventor: Takashi Ishidoshiro, Nagoya (JP)

(73) Assignee: Buffalo Inc., Nagoya (JP)

( * ) Notice: Subject to any disclaimer, the term of this patent is extended or adjusted under 35 U.S.C. 154(b) by 242 days.

(21) Appl. No.: 10/233,273

(22) Filed: Aug. 30, 2002

(65) Prior Publication Data

US 2004/0204005 A1   Oct. 14, 2004

(30) Foreign Application Priority Data

Jun. 14, 2002   (JP)   ............... 2002-174828

(51) Int. Cl.
*H04M 3/42* (2006.01)
*H04Q 7/24* (2006.01)
*G06F 15/16* (2006.01)

(52) U.S. Cl. .................. 455/414.1; 370/338; 709/218

(58) Field of Classification Search ............. 455/414.1, 455/554.2, 557, 558, 555, 559, 418, 420, 455/556.1–556.2, 550; 375/220, 222; 709/227, 709/217, 232, 250, 201, 202, 203, 230, 218, 709/219; 370/338
See application file for complete search history.

(56) References Cited

U.S. PATENT DOCUMENTS

| | | | | |
|---|---|---|---|---|
| 5,630,159 A | * | 5/1997 | Zancho ..................... | 709/221 |
| 6,144,855 A | * | 11/2000 | Slovin ...................... | 455/432.1 |
| 6,633,759 B1 | * | 10/2003 | Kobayashi ................ | 455/419 |
| 6,704,295 B1 | * | 3/2004 | Tari et al. ................. | 370/270 |
| 2002/0150120 A1 | * | 10/2002 | Tordera et al. ............ | 370/449 |
| 2003/0035471 A1 | * | 2/2003 | Pitsoulakis ............... | 375/222 |
| 2003/0079135 A1 | * | 4/2003 | Jones ........................ | 713/182 |
| 2004/0003150 A1 | * | 1/2004 | Deguchi .................... | 710/62 |
| 2004/0025047 A1 | * | 2/2004 | Mayne et al. ............. | 713/200 |

FOREIGN PATENT DOCUMENTS

| | | |
|---|---|---|
| CN | 1202291 A | 12/1998 |
| EP | 1 037 434 A1 | 9/2000 |
| JP | 2002-077391 | 8/2000 |
| JP | 2002-099975 | 9/2000 |
| JP | 2002-117067 | 10/2000 |
| JP | 2002/140359 | 11/2000 |
| WO | WO97/18635 | 5/1997 |
| WO | WO01/55926 A1 | 8/2001 |
| WO | WO 01/95592 A1 | 12/2001 |
| WO | WO 02/13487 A2 | 2/2002 |

OTHER PUBLICATIONS

Chinese Office Action, dated Feb. 10, 2006, 3 pages.

* cited by examiner

*Primary Examiner*—Naghmeh Mehrpour
(74) *Attorney, Agent, or Firm*—Beyer Weaver LLP

(57) ABSTRACT

The present invention provides a wireless LAN system 22 that causes a client 40 to display information of a local unit.

A wireless LAN device 20 has a function of connecting the client 40 of a LAN with another network 50. The wireless LAN device 20 has a memory 27 that stores Web data, which is displayable by a browser of the Internet, and a controller 26 that spontaneously transmits the Web data stored in the memory to the client 40 of the wireless LAN system 22 at a predetermined timing.

12 Claims, 6 Drawing Sheets

| LINK INFORMATION | TIME OF STORAGE | TIME OF TRANSMISSION |
|---|---|---|
| △△△ | ○○ | ×× |
| ... | ... | ... |
|  |  |  |

170

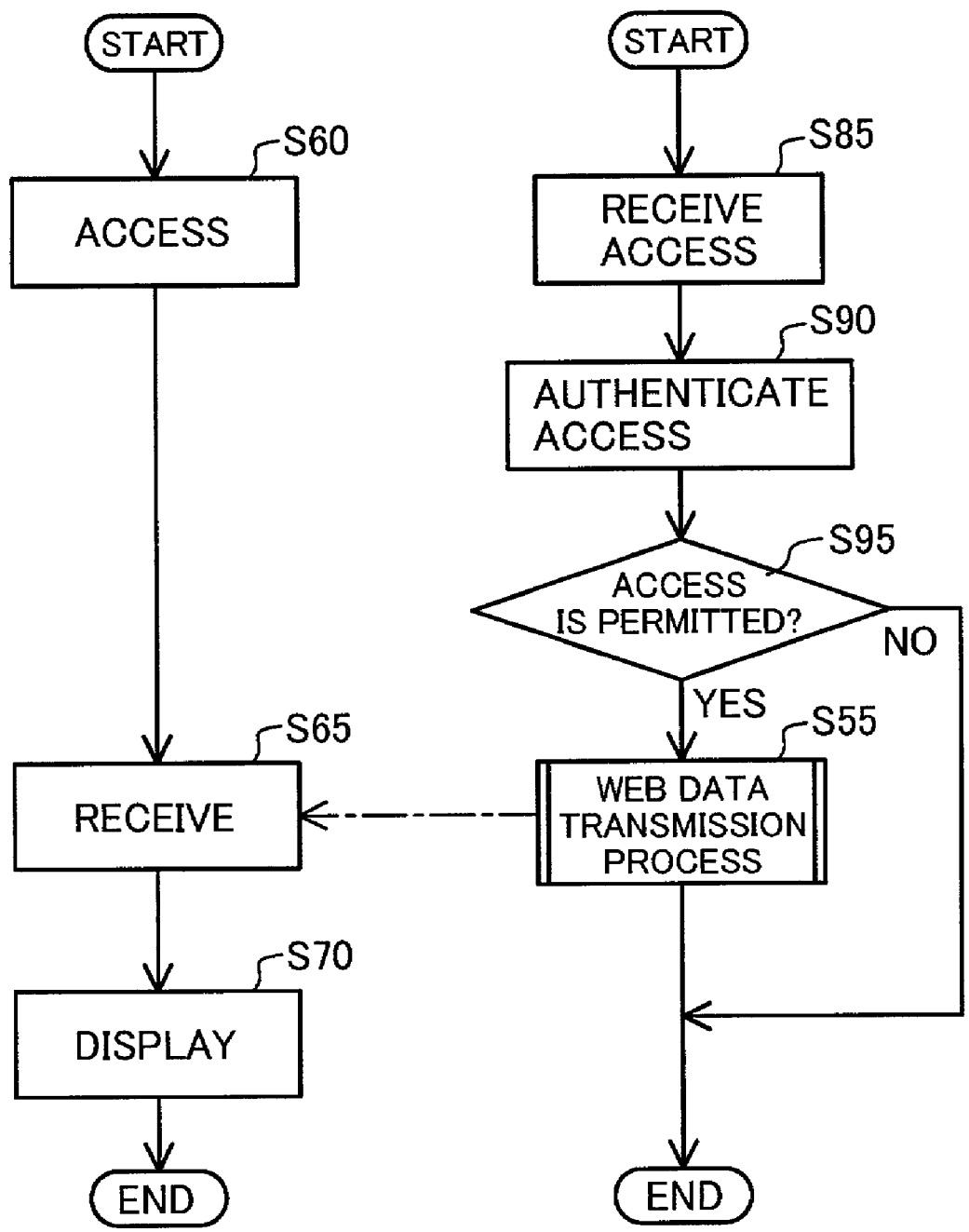

WIRELESS LAN DEVICE

BACKGROUND OF THE INVENTION

1. Field of the Invention

The present invention relates to a wireless LAN device.

2. Description of the Related Art

Advertising and public information in the form of banners and sub-windows is a popular technique adopted in the process of browsing Web pages on the Internet. Information for displaying a sub-window is transmitted simultaneously with information for displaying a Web page, which is transmitted by a Web server on the Internet. Alternatively a node on the Internet transmits the information for displaying the sub-window in an additional manner. A resulting sub-window is displayed on a client, based on the transmitted information.

In order to attain display of advertising and public information in the form of a sub-window, it is required to provide the information for displaying the sub-window (a program like HTML or JavaScript) on a node outside the LAN. A server or any equivalent is required to transmit the information for displaying the sub-window in addition to the information for displaying the Web page to the client.

SUMMARY OF THE INVENTION

The object of the present invention is thus to solve the above drawbacks and to provide a wireless LAN device, which causes a client of a wireless LAN to display information of a local unit.

In order to attain at least part of the above object, the present invention is directed to a wireless LAN device having a function of connecting a client of a LAN with another network. The wireless LAN device includes: a storage module that stores therein Web data, which is displayable by a browser of the Internet; and a transmission module that spontaneously transmits the Web data stored in the storage module to the client at a predetermined timing.

At least part of the above object is also attained by a wireless LAN system including a wireless LAN device, which has a function of connecting a client of a LAN with another network. The wireless LAN system has a memory module that is located on a network and stores therein Web data, which is displayable by a browser of the Internet. The wireless LAN device includes: a link storage module that stores a link to the Web data; and a transmission module that spontaneously transmits the Web data by the link to the client at a predetermined timing.

Any of the above device, the system, and a corresponding method enables the client of the wireless LAN to display information of a local unit. The information may be transmitted periodically. This enhances the reliability of information transmission. The information may be transmitted at a time when the client connects with the wireless LAN device. This ensures transmission of the information to the client at least once. In one preferable application, the information is transmitted to all clients belonging to the wireless LAN, which are connected with the wireless LAN device. This application further enhances the reliability of information transmission.

It is preferable that the information is displayed at a user's noticeable position on a window of the client. This enhances the possibility that the user views the information. In another preferable application, a management client, which manages the wireless LAN device, updates the information at a specified timing. This application allows updated information to be transmitted to the client of the wireless LAN device.

BRIEF DESCRIPTION OF THE DRAWINGS

FIG. 7 is a flowchart showing a process of transmitting Web data in response to an access from the client 40 in a second embodiment.

DESCRIPTION OF THE PREFERRED EMBODIMENTS

First Embodiment (1) Construction

Figure 1:
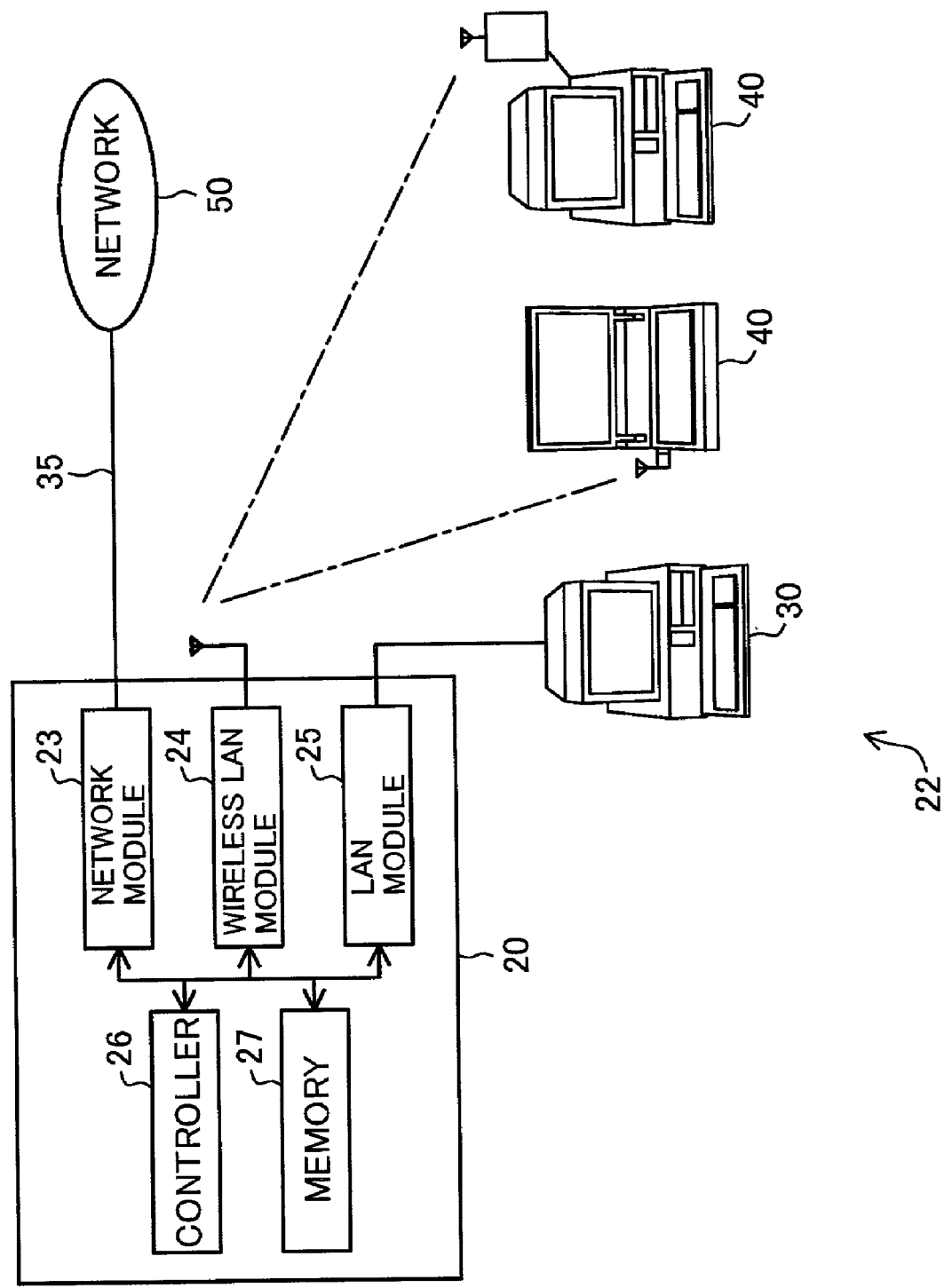
FIG. 1 illustrates the general construction of a wireless LAN system 22.

A first embodiment of the present invention is discussed below with reference to accompanied drawings. FIG. 1 illustrates the general construction of a wireless LAN system 22. In this embodiment, a wireless LAN device 20 shown in FIG. 1 is located in a public space, such as a condominium or a small community, and is connected with a provider of a network 50, such as the Internet, via an ADSL line 35. The wireless LAN device 20 includes a network module 23, a wireless LAN module 24, and a LAN module 25 that respectively take charge of input and output from and to the network 50, a wireless LAN, and a LAN. The wireless LAN device 20 also includes a memory 27 and a controller 26 that controls the functions of the respective constituents.

Each client 40 represents a terminal owned by a resident of the condominium or a member of the small community who is authorized to utilize the wireless LAN system 22. The client 40 can connect with the LAN module 25 of the wireless LAN device 20 via a cable or with the wireless LAN module 24 of the wireless LAN device 20 by air. Namely each client 40 is allowed to connect with the network 50 via the wireless LAN device 20.

A management client 30 represents a terminal owned by a management representative of the condominium or the small community. The management representative uses the management client 30 to manage the wireless LAN system 22 of FIG. 1.

Figure 2:
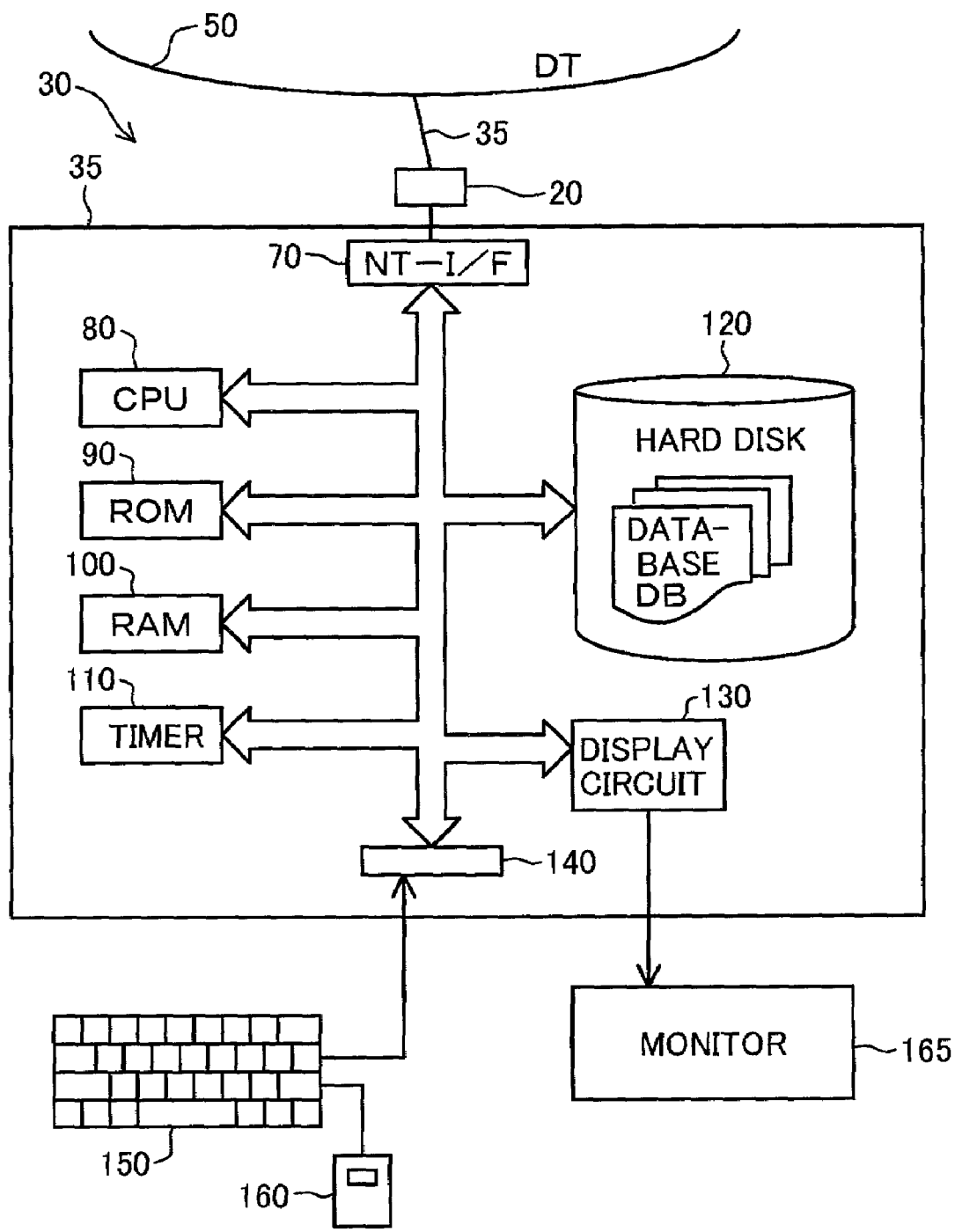
FIG. 2 illustrates the internal structure of a management client 30.

The internal structure of the management client 30 is discussed with reference to FIG. 2. The management client 30 includes a network interface (NT-I/F) 70 that controls data transmission to and from the network 50 via the wireless LAN device 20, a CPU 80 that executes diverse series of processing, a ROM 90 that stores processing programs and static data, a RAM 100 that functions as a work area, a timer 110 that manages time, a display circuit 130 that is in charge of display on a monitor 165, a hard disk (HD) 120 that accumulates text data in the form of a database, and an input interface (I/F) 140 that works as an interface with a keyboard 150 and a mouse 160.

The hard disk 120 is illustrated as an internal element in this embodiment, but may be a removable external unit. A removable storage medium (for example, a CD-ROM, a CD-R, a CD-RW, a DVD-ROM, a DVD-RAM, or a flexible disk) may be used in addition to the hard disk 120. In the structure of the embodiment, the processing programs are stored in the ROM 90 of the management client 30. In another application, the processing programs are stored in the hard disk 120 and are extracted on the RAM 100 to be executed at the time of activation. The processing programs may otherwise be read from the removable storage medium or read from another terminal via the network 50 to be executed. It is not required that all the required data are stored in the hard disk 120. Vast amounts of data may be stored in a distributive manner, updated, and managed by another server connected via the network 50. The client 40 has the internal structure practically similar to that of the management client 30.

(2) Outline of Processing

In the structure of the first embodiment, information used for a link to predetermined Web data (hereafter referred to as link information) is stored in the wireless LAN device 20 by the management client 30. Here the Web data represents data described in an HTML language, which can be interpreted by a browser of the Internet. The wireless LAN device 20 transmits Web data corresponding to the stored link information to the client 40 in a periodic manner. The client 40 displays a banner or a sub-window 175 on its window, based on the received Web data.

(3) Processing

Figures 3, 4:
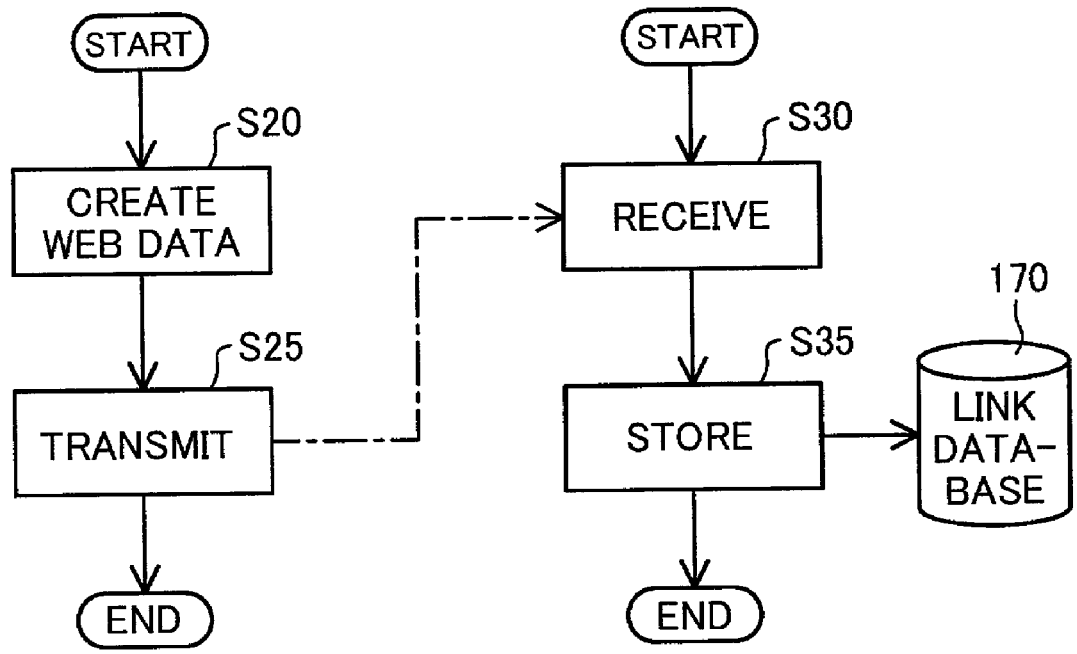
FIG. 3 is a flowchart showing a storage process.
FIG. 4 shows a link database 170.

The following describes the details of the processing summarized in (2). The description first regards a series of processing executed by the management client 30 to store the link information in the wireless LAN device 20 (hereafter referred to as storage process). FIG. 3 is a flowchart showing the storage process. The right side of the flowchart is a series of processing executed by the wireless LAN device 20, whereas the left side is a series of processing executed by the management client 30. The Web data is created according to public information in a condominium or a small community, which should be notified to residents of the condominium or members of the community. The management client 30 first creates Web data in an HTML language (step S20). The Web data is set, such that the sub-window 175 of FIG. 6 displayed by a browser based on the Web data is located a little upper than the center of the screen and over another window opened by the browser. The setting of the Web data also includes a permission or prohibition that allows or forbids the client 40 to close the sub-window 175. This preset information is called closing information. The management client 30 subsequently transmits link information mapped to the created Web data to the wireless LAN device 20 (step S25).

The wireless LAN device 20 receives the transmitted link information mapped to the Web data (step S30) and stores the received link information in a link database 170 (step S35). The date of storage is also stored in the link database 170.

FIG. 4 shows an example of the link database 170. Each record of the link database 170 includes link information, the date of storage, and the date of transmission. The date of transmission is set Null on initial registration of the link information. Old records of the link information are kept, while a new record of the link information is newly stored. The management representative may gain access to the wireless LAN device 20 and delete non-required old records of the link information.

Figure 5:
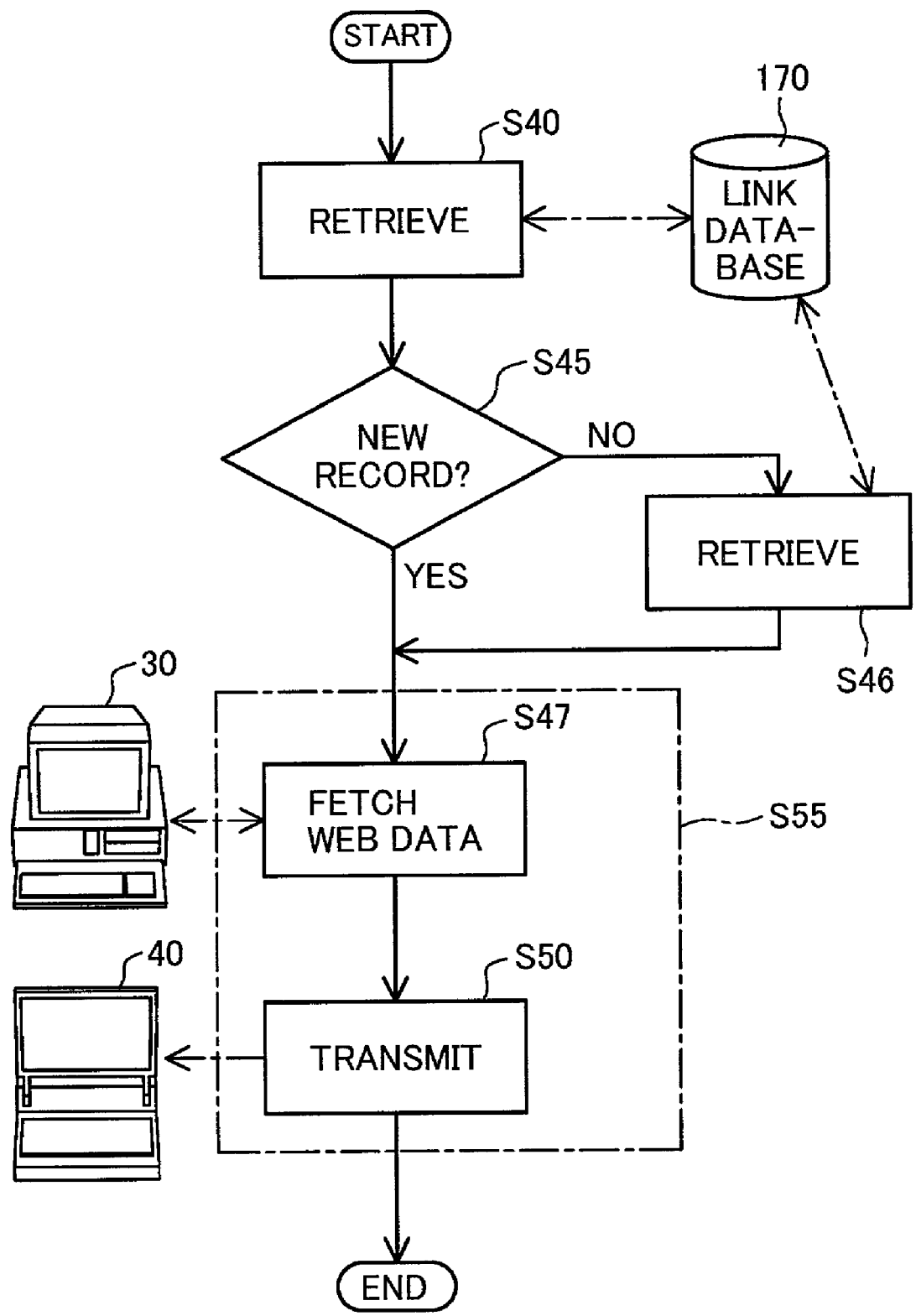
FIG. 5 is a flowchart showing a process of transmitting Web data to a client 40 in a first embodiment.

FIG. 5 is a flowchart showing a process of transmitting the Web data to the client 40. The wireless LAN device 20 retrieves the date of transmission in the link database 170 when a preset time has elapsed since a previous transmission time. When there is any record including Null data as the date of transmission (step S45), it means that the record is a newly registered record. The wireless LAN device 20 then fetches Web data corresponding to the link information of the new record from the management client 30 (step S47), and transmits the Web data fetched from the management client 30 to all the clients 40 of the wireless LAN system 22 connecting therewith (step S50).

When there is no record including Null data as the date of transmission (step S45), on the other hand, the wireless LAN device 20 retrieves the link database 170 to find an oldest record having the oldest date of transmission (step S46). The wireless LAN device 20 fetches Web data corresponding to the link information of the retrieved oldest record from the management client 30 (step S47), and transmits the fetched Web data to all the clients 40 of the wireless LAN system 22 connecting therewith (step S50). The processing of steps S47 and S50 is collectively referred to as a Web data transmission process (step S55).

Figure 6:
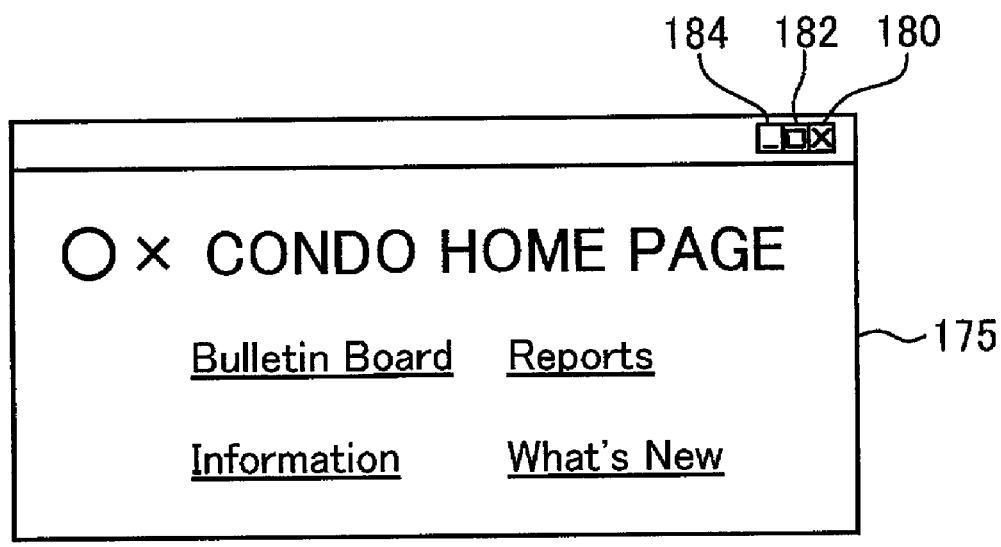
FIG. 6 shows a sub-window 175 open on the client 40.

The client 40 of the wireless LAN system 22 receives the Web data from the wireless LAN device 20 and uses the browser to interpret the Web data described in the HTML language. The resulting sub-window 175 based on the Web data is accordingly displayed a little upper than the center of the screen and over another window opened by the browser. The close information set in the Web data determines whether or not the client 40 is allowed to close the display of the sub-window 175. FIG. 6 shows an example of the sub-window 175 displayed on the client 40. In this example, the close information allows the client 40 to close the sub-window 175 by a click of a button 180. The sub-window 175 may be maximized by a click of a button 182 and minimized by a click of a button 184.

The arrangement of this embodiment enables the sub-window 175 to be displayed on the client 40 of the wireless LAN system 22 in a periodical manner. A document of public information, which is conventionally transmitted in the form of paper media, is written as Web data and is readily transmitted to the users of the respective clients 40 via the wireless LAN system 22 of the invention. The public information to be transmitted to the clients 40 is readily and quickly changed by simple modification of the Web data stored in the management client. This arrangement does not require any server, since the wireless LAN device 20 transmits the Web data to the client 40. It is desirable that the wireless LAN system 22 of the embodiment is small-sized.

Second Embodiment

The structure of a second embodiment transmits Web data to the client 40 in response to an access from the client 40 to the wireless LAN device 20. The link information mapped to the Web data is generated in advance by the management client 30 and is stored in the link database 170. FIG. 7 is a flowchart showing a process of transmitting Web data in response to an access from the client 40. The right side of the flowchart is a series of processing executed by the wireless LAN device 20, whereas the left side is a series of processing executed by the client 40.

When the client 40 of the wireless LAN system 22 accesses the wireless LAN device 20 (step S60), the wireless LAN device 20 receives the access (step S85) and authenticates the access of the client 40 (step S90). The access authentication determines whether or not the client 40 is allowed to utilize the wireless LAN system 22. When the result of the access authentication determines that the client 40 has no right to access (step S95), the program exits from the routine without any further processing. When the client 40 has the right to access (step S95), on the other hand, the Web data transmission process (step S55 in FIG. 5) is carried out to the client 40.

The arrangement of the second embodiment exerts the same functions and effects as those of the first embodiment and additionally enables the client 40 connecting with the wireless LAN device 20 to display the sub-window 175 at least once.

The above embodiments and their applications are to be considered in all aspects as illustrative and not restrictive. There may be many modifications, changes, and alterations without departing from the scope or spirit of the main characteristics of the present invention. For example, the technique of the present invention is applicable to a wireless hotspot service, where the wireless LAN device 20 is installed in a coffee shop or a restaurant. The contents of the Web data transmitted to the client 40 are not restricted to the public information, but may be advertisements. The Web data may be advertisements in the wireless LAN system 22 set in the condominium. The wireless LAN system 22 may transmit different advertisements in different districts. In the case of transmission of an advertisement to the clients 40, the system may charge its advertising provider for the advertisement.

The Web data are not required to be stored in the management client 30. In one modified structure, a specific external server is specified as a contents server, and the wireless LAN device 20 has an address index of the contents server. The structure using the external server consolidates a plurality of wireless LAN devices 20, for example, to modify the advertising or public information, and facilitates establishment of the service providing business. The external server may have a large storage capacity of the Web data. This structure also enables only the data linked with master data to be instantaneously updated without altering the master data.

The wireless LAN device 20 may store the Web data therein. In this structure, all the data to be transmitted to the client 40 are stored in the wireless LAN device. This arrangement does not require activation of any other devices including the management client 30 and thus simplifies the management.

The Web data may be transmitted at various timings. For example, in the structure of the second embodiment, the Web data may be transmitted not only to the client 40 that has just gained connection with the wireless LAN device 20 but all the clients 40 that are connected with the wireless LAN device 20 at the moment.

The management representative of the wireless LAN system 22 may individually specify the time or the timing of transmission of the Web data. The corresponding Web data may be transmitted at the specified time or timing. This arrangement is convenient when it is desired to transmit Web data at any particular time. The data transmission may be carried out manually.

In the case that each client 40 of the wireless LAN system 22 is identifiable, the setting may allow transmission of individual Web data to each client 40. For example, in the wireless LAN system 22 in the condominium or the small community, each client 40 is identifiable. The service may be provided to manage the respective clients 40 and transmit Web data suitable for the taste of each client 40.

The technique of the present invention is also applicable to the system where the client 40 does not use the browser of the Internet but uses another protocol, such as Telnet, for access. In this system, a first connection is established by the browser of the Internet to display the sub-window 175 with no exceptions. The client then gains a permission of access with the protocol, such as Telnet. This arrangement enables the advertising or public information in the form of the sub-window 175 to be displayed at the time of starting an access, regardless of the application used by the client 40. Namely this arrangement ensures the exposure of the advertising or public information.

What is claimed is:

1. A wireless LAN base station providing a wireless LAN that connects a wireless LAN client to a WAN, said wireless LAN base station comprising:
   a storage module for storing display data which is displayable by a Web browser, wherein the display data is different from Web data obtained via the WAN by request from the wireless LAN client and is obtained from a management client without the WAN along the path, the management client manages said wireless LAN base station;
   a transmission module that spontaneously transmits the stored display data to the wireless LAN client belonging to a wireless LAN, at predetermined time intervals associated with a previous transmission time; and
   wherein the display data is stored in the storage module without specifying a destination to which the display data is to be transmitted by the transmission module.

2. A wireless LAN base station in accordance with claim 1, wherein the predetermined time intervals are periodic timing.

3. A wireless LAN base station in accordance with claim 1, the wireless LAN base station further comprising a second transmission module that spontaneously transmits the stored display data to the wireless LAN client at a time when the wireless LAN client connects with said wireless LAN base station.

4. A wireless LAN base station in accordance with claim 1, wherein said transmission module transmits the display data to all wireless LAN clients belonging to the wireless LAN.

5. A wireless LAN base station in accordance with claim 1, wherein the display data includes specific data for specifying a display position by the Web browser.

6. A wireless LAN base station in accordance with claim 1, wherein the stored display data is updated by the management client.

7. A method of providing a wireless LAN that connects a wireless LAN client to a WAN by a wireless LAN base station, said method comprising the steps of:
   storing display data in the wireless LAN base station, wherein the display data is displayable by a Web browser and is different from Web data obtained via the WAN by request from the wireless LAN client, and is obtained from a management client without the WAN along the path, the management client manages said wireless LAN base station;
   spontaneously transmitting the stored display data to the wireless LAN client belonging to the wireless LAN at predetermined time intervals associated with a previous transmission time; and
   wherein the display data is stored in the wireless LAN base station without specifying a destination to which the display data is to be transmitted by the wireless LAN base station.

8. A wireless Local Area Network (LAN) device, wherein said wireless LAN device is a part of a wireless LAN that additionally includes at least one wireless LAN client and a LAN management client, and said wireless LAN device is capable of connecting said at least one wireless LAN client to a Wide Area Network (WAN), said wireless LAN device comprising:
- a storage module configured for storing LAN data, wherein said LAN data originates from said LAN management client and is sent to said wireless LAN device via said wireless LAN, and said LAN data never exists outside said wireless LAN; and
- a transmission module configured for spontaneously transmitting said LAN data stored in said storage module to said at least one wireless LAN client at predetermined time intervals referenced against a previous transmission time.

9. The wireless LAN device in accordance with claim 8, wherein said LAN data is stored in said storage module without information relating to where said LAN data is to be transmitted by said transmission module.

10. The wireless LAN device in accordance with claim 8, wherein said LAN data is transmitted by said transmission module to said at least one wireless LAN client via said wireless LAN and never exists outside said wireless LAN.

11. The wireless LAN device in accordance with claim 8, wherein said LAN data is displayed on said at least one wireless LAN client after said LAN data is transmitted to said at least one wireless LAN client by said transmission module.

12. The wireless LAN device in accordance with claim 8, said wireless LAN device further comprising:
- a second transmission module configured to spontaneously transmitting said LAN data to said at least one LAN client when said at least one LAN client connects with said wireless LAN device.

* * * * *